(12) United States Patent
Buchmann et al.

(10) Patent No.: US 7,338,248 B2
(45) Date of Patent: Mar. 4, 2008

(54) BATTERY CHANGING SYSTEM FOR AN INDUSTRIAL TRUCK

(75) Inventors: Michael Buchmann, Glinde (DE); Udo Neumann, Brunsbek (DE)

(73) Assignee: STILL GmbH, Hamburg (DE)

( * ) Notice: Subject to any disclaimer, the term of this patent is extended or adjusted under 35 U.S.C. 154(b) by 318 days.

(21) Appl. No.: 10/694,630

(22) Filed: Oct. 27, 2003

(65) Prior Publication Data

US 2005/0036861 A1    Feb. 17, 2005

(30) Foreign Application Priority Data

Oct. 28, 2002    (DE) ................ 102 50 140

(51) Int. Cl.
*B60P 1/00* (2006.01)
(52) U.S. Cl. ................................. 414/522
(58) Field of Classification Search ........ 414/398, 414/522, 340; 193/35 TE; 198/588
See application file for complete search history.

(56) References Cited

U.S. PATENT DOCUMENTS

| | | | | |
|---|---|---|---|---|
| 4,093,084 | A | * | 6/1978 | Ringer .................. 414/343 |
| 4,308,946 | A | * | 1/1982 | Ouellette ................ 198/790 |
| 4,459,732 | A | * | 7/1984 | Driggers ................ 29/426.3 |
| 5,595,442 | A | | 1/1997 | Glass et al. |
| 5,998,963 | A | | 12/1999 | Aarseth |
| 6,094,028 | A | * | 7/2000 | Gu et al. .................. 320/109 |
| 2004/0173408 | A1 | * | 9/2004 | Szymanski et al. ......... 187/222 |

FOREIGN PATENT DOCUMENTS

| | | |
|---|---|---|
| EP | 0 030 928 A1 | 6/1981 |
| EP | 1 095 831 A2 | 5/2001 |
| GB | 2 317 872 A | 4/1998 |
| JP | 08165094 | 6/1996 |
| JP | 11-246193 * | 9/1999 |
| WO | WO 00/58139 A | 10/2000 |

* cited by examiner

*Primary Examiner*—Charles A Fox
(74) *Attorney, Agent, or Firm*—The Webb Law Firm

(57) ABSTRACT

A battery changing system is provided to change the battery in an industrial truck, such as a fork lift truck, with a battery block that can be moved in the horizontal direction by a roller conveyor relative to a battery compartment of the industrial truck. The invention teaches that the battery in the industrial truck can be changed easily and economically by providing an external roller conveyor (5) that can be moved in the vertical direction. To change the battery, the roller conveyor (5) can be placed underneath a battery compartment (2) in the industrial truck that contains the battery (1) and then the roller conveyor (5) can be raised. A floor (7) of the battery compartment (2) of the industrial truck can be provided with at least one opening (8; 9) for receiving one or more rollers of the roller conveyor (5).

4 Claims, 4 Drawing Sheets

BATTERY CHANGING SYSTEM FOR AN INDUSTRIAL TRUCK

CROSS REFERENCE TO RELATED APPLICATION

This application corresponds to German Application No. 102 50 140.8 filed Oct. 28, 2002, which is herein incorporated by reference in its entirety.

BACKGROUND OF THE INVENTION

1. Field of the Invention

This invention relates to a battery changing system to change the battery of an industrial truck, such as a fork lift truck, having a battery block that can be moved by means of a roller conveyor in a horizontal direction relative to a battery compartment of the industrial truck.

2. Technical Considerations

On conventional industrial trucks having a battery block that can be pushed into or out of the battery compartment in a horizontal direction, for example in a lateral direction with respect to the industrial truck, the known art describes battery changing systems in which the floor of the battery compartment of the industrial truck is provided with a horizontal roller conveyor. To change the battery, an external roller conveyor is placed next to the industrial truck adjacent to the internal roller conveyor that is permanently installed in the industrial truck. Using these two conveyors, the battery block can be pulled all the way out of the battery compartment. The known art also describes industrial trucks in which the roller conveyor that is located on the floor of the battery compartment can be extended or folded outwardly so that the battery block can be pulled all the way out of the battery compartment using the roller conveyor that is permanently installed in the industrial truck. The battery can then be transported by means of a pallet truck, an overhead crane, or another industrial truck. Battery changing systems of these types are used on a wide variety of industrial trucks, such as counterweighted electric fork lift trucks, reach trucks, pallet trucks, or high lift stackers.

However, one disadvantage of these known battery changing systems is that a roller conveyor that is permanently installed in an industrial truck makes the industrial truck more expensive to manufacture. Furthermore, because the battery block in the battery compartment is mounted on the roller conveyor, the battery block must be secured and fixed in position during operation of the industrial truck to prevent movement of the battery block, for example to keep it from bumping into the walls of the battery compartment. In industrial trucks with a lateral opening for changing the battery, the battery block must also be secured in position to prevent it from unintentionally rolling out of position if the side wall of the battery compartment is open. This requirement to secure the battery block likewise entails additional manufacturing costs. Furthermore, a drive device, such as a drive mechanism for the roller conveyor, is necessary to move battery blocks that are too heavy to be moved manually. This, in turn, makes the industrial truck significantly more expensive to manufacture. High loads are also experienced in the vicinity of the points of contact between the rollers of the roller conveyor and the battery block on account of the heavy weight of the battery block. As a result of which, these areas are exposed to a high amount of wear. In addition, the roller conveyor that is permanently attached to the vehicle requires additional space inside the battery compartment, in particular in the vertical dimension of the battery compartment, which makes it more difficult to achieve the objective of the most compact possible dimensions of the industrial truck.

Therefore, it is an object of the invention to provide a battery changing system which makes it possible to change the battery while entailing relatively lower additional costs for the manufacture of the industrial truck.

SUMMARY OF THE INVENTION

The invention teaches that to change the battery of an industrial truck, an external roller conveyor that can be moved in the vertical direction is provided. The vertically movable external roller conveyor can be placed underneath the battery compartment that contains the battery block and can be raised. The floor of the battery compartment of the industrial truck can be provided with at least one opening for the external roller conveyor. As a result of the use of an external roller conveyor that is not a part of the industrial truck and can be placed underneath the battery block and raised as well as lowered, there is no need for a roller conveyor that is permanently installed inside the industrial truck. A battery changing system of the invention with an external roller conveyor can thus be used to change the batteries in many different types of industrial trucks. For this purpose, all that is necessary on the industrial trucks is an opening in the floor of the battery compartment for the roller conveyor, which can be manufactured easily and at relatively little added cost. The battery block in the industrial truck can sit on the floor of the battery compartment either directly or by means of rubber mounts, in which case the battery block is exposed to lower stresses and reduced wear compared to an installation in industrial trucks that have a roller conveyor integrated into the battery compartment. A mechanism to secure the battery block is also unnecessary because impacts during operation of the industrial truck between the battery block and the side walls of the battery compartment are prevented by placing the battery block directly on the floor surface, a measure which likewise prevents the battery block from rolling out accidentally if the side wall is open. As a result of the elimination of a roller conveyor permanently installed in the industrial truck, no additional space is required, in particular in the vertical dimension, for the battery changing system in the industrial truck. As a result of which, an industrial truck with compact dimensions can be created.

In one embodiment, the battery block can be moved all the way out of the battery compartment by means of the external roller conveyor. The roller conveyor can be, therefore, of an appropriate length so that the battery block can be rolled all the way out of the battery compartment on the roller conveyor and a new battery block can be placed on the roller conveyor and pushed into the battery compartment.

In one advantageous realization of the invention, the floor of the battery compartment of the industrial truck can be provided with a plurality of openings for receiving rollers of the roller conveyor. With a plurality of openings in the floor of the battery compartment, in each of which openings a roller of the roller conveyor can be inserted, it becomes a simple matter to raise or lower the battery block by means of the roller conveyor to change the battery.

It is particularly advantageous if, as in an additional realization of the invention, the floor of the battery compartment is provided with one opening to receive a plurality of rollers of the roller conveyor. With a cutout of sufficiently large dimensions in the floor of the battery compartment, the battery block can also be raised or lowered by means of the roller conveyor. As a result of the presence of the cutout in the floor, it becomes easy to change the battery because the requirements for the positioning of the roller conveyor are not very strict. In addition, different roller conveyors with different arrangements of the rollers can be used to change the battery.

In one realization of the invention, the roller conveyor can be a one-part component.

In one development of the invention, the roller conveyor can be constructed from two or more parts in the longitudinal direction of the conveyor.

In one realization, the roller conveyor can have a stationary segment which, during the battery changing procedure, can be located next to the battery compartment of the industrial truck and can have a vertically movable segment which can be moved underneath the battery compartment of the industrial truck. With this realization, the cost of construction for the roller conveyor can be reduced because the mechanically complex segment that can be raised and lowered need only cover the area of the battery compartment and can, therefore, be kept relatively short. The stationary segment of the roller conveyor is thereby advantageously at the same level as the vertically movable segment after the movable segment is raised or before it is lowered. The battery block can thus be moved out of and into the battery compartment without having to overcome any differences in levels.

In an additional realization, the roller conveyor can have a first segment and at least one second segment that can be moved to extend the first segment. A roller conveyor with two telescoping segments can be kept to a compact size.

The second segment can be advantageously mounted by means of a guide device so that it can move longitudinally on the first segment.

It is particularly advantageous if the roller conveyor is effectively connected with a steerable device and/or with a lifting device. For this purpose, the roller conveyor can be realized in the form of a steerable device that has a lifting device. It is also possible to realize the roller conveyor in the form of an accessory that can be placed on top of an industrial truck, for example for a pallet truck. This feature makes it possible to have a roller conveyor that can be easily driven, raised, and lowered.

In an alternative realization, the roller conveyor can also be stationary and can be effectively connected with a lifting device. For example, the roller conveyor can be lowered into the floor surface so that the industrial truck can be positioned above the roller conveyor and the roller conveyor raised to change the battery. The battery block can be moved manually onto the roller conveyor. With heavy battery blocks that are too heavy to push by hand, it is advantageous if a drive device is provided to move the battery block. A roller conveyor with a drive device for the battery block can also be easily integrated into a system to change the battery automatically.

In one realization of the invention, the drive device can be realized in the form of a drive for at least one roller of the roller conveyor.

The roller conveyor can be provided with a stop so that the limit position of the battery block when it is located outside the battery compartment on the roller conveyor can be easily defined. It thereby becomes possible to prevent the battery block from rolling beyond the end of the roller conveyor and to ensure that the battery can be transported and set down safely at its destination.

It is particularly advantageous if a retaining device is provided on the roller conveyor to connect the roller conveyor with the industrial truck. The retaining device makes it easy to couple the roller conveyor with the industrial truck during the battery changing operation. It thereby becomes possible to prevent the roller conveyor from sliding away during the extraction or insertion of the battery block and, thus, to change the battery safely.

BRIEF DESCRIPTION OF THE DRAWINGS

Additional advantages and features of the invention are explained in greater detail below with reference to the exemplary embodiments illustrated in the accompanying schematic drawings in which like reference symbols identify like parts throughout:

FIG. 1b is an overhead view of the battery changing system illustrated in FIG. 1a;

FIG. 2b is an overhead view of the battery changing system illustrated in FIG. 2a;

FIG. 3b is an overhead view of the battery changing system illustrated in FIG. 3a;

FIG. 4b is an overhead view of the battery changing system illustrated in FIG. 4a.

DESCRIPTION OF THE PREFERRED EMBODIMENTS

Figure 1A:
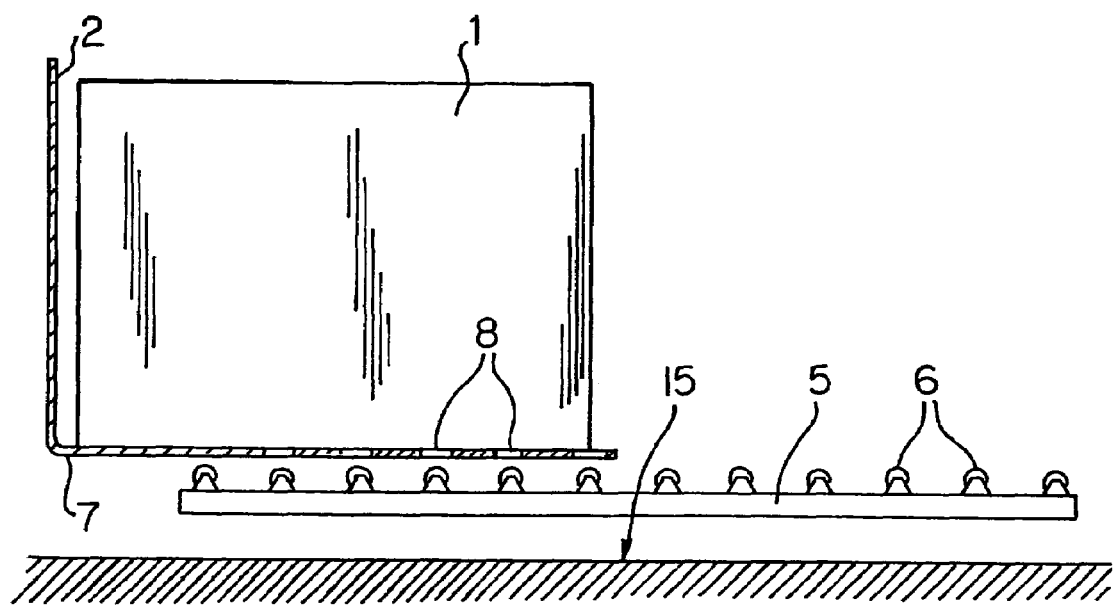
FIG. 1a is a side view of a first embodiment of a battery changing system of the invention.
Figure 1B:
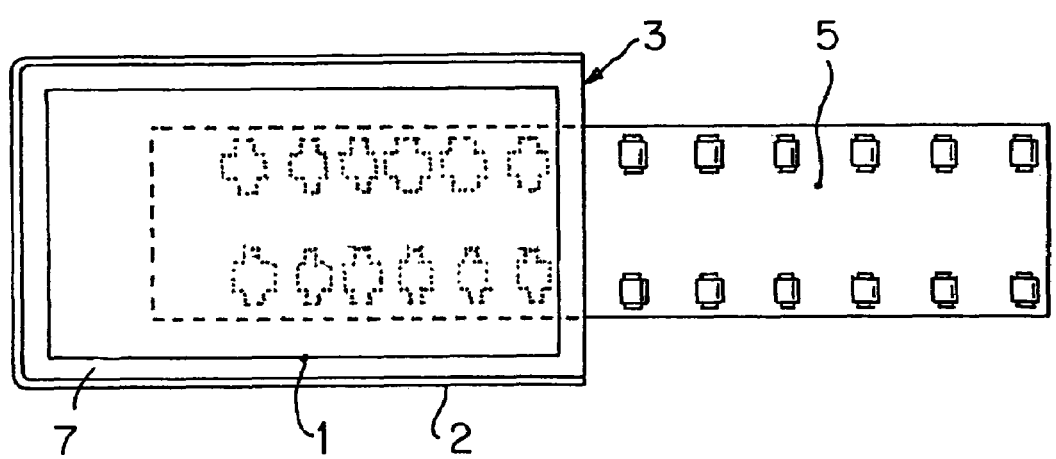

FIGS. 1a and 1b show a battery changing system that can be used to change the battery of an industrial truck, for example an industrial truck that has a lateral opening to change the battery. In the illustrated system, a battery block 1 is located in a battery compartment 2 of the industrial truck. The battery compartment 2 is provided in the right-hand area of the figure with an opening 3 that can be closed, for example by means of a hinged side wall, and through which the battery block 1 can be removed in the horizontal (e.g., lateral) direction from the battery compartment 2 or inserted into the battery compartment 2.

To change the battery, there is an external roller conveyor 5 that can be moved in the vertical direction, i.e., raised and lowered with respect to a surface on which it is located. The roller conveyor 5 can have a plurality of rollers 6 that can be arranged in one or more rows. The floor 7 of the battery compartment 2 of the industrial truck is provided with a plurality of openings 8 for receiving at least one roller 6 of the roller conveyor 5.

To remove the battery block 1, the roller conveyor 5 is placed underneath the battery compartment 2 so that at least some of the rollers 6 of the roller conveyor 5 coincide with or align with the openings 8. The roller conveyor 5 can be raised in the vertical direction with respect to the floor 15. Rollers 6 of the roller conveyor 5 thereby come into contact with the battery block 1 through the openings 8 in the floor 7 of the battery compartment 2. By means of the roller conveyor 5, the battery block 1 is thus lifted and can be moved out of the battery compartment 2 in the horizontal (e.g., lateral) direction. The length of the roller conveyor 5 can be such that the battery block 1 can be moved all the way out of the battery compartment 2. In an industrial truck with a lateral battery changing opening, the battery block 1 can, therefore, be moved all the way out and placed next to the industrial truck. In this position, the battery block 1 can be picked up by another transport system, such as a crane or another industrial truck, for example.

The procedure to insert a new battery block 1 is the reverse of that described above. To insert a new battery block 1, the new battery block 1 is placed on the roller conveyor 5 next to the battery compartment 2 and is moved from its position next to the industrial truck into the battery compartment 2 through the opening 3. The roller conveyor 5 is then lowered until the battery block 1 is sitting on the floor 7 of the battery compartment 2. The roller conveyor 5 can then be extracted.

Figure 2A:
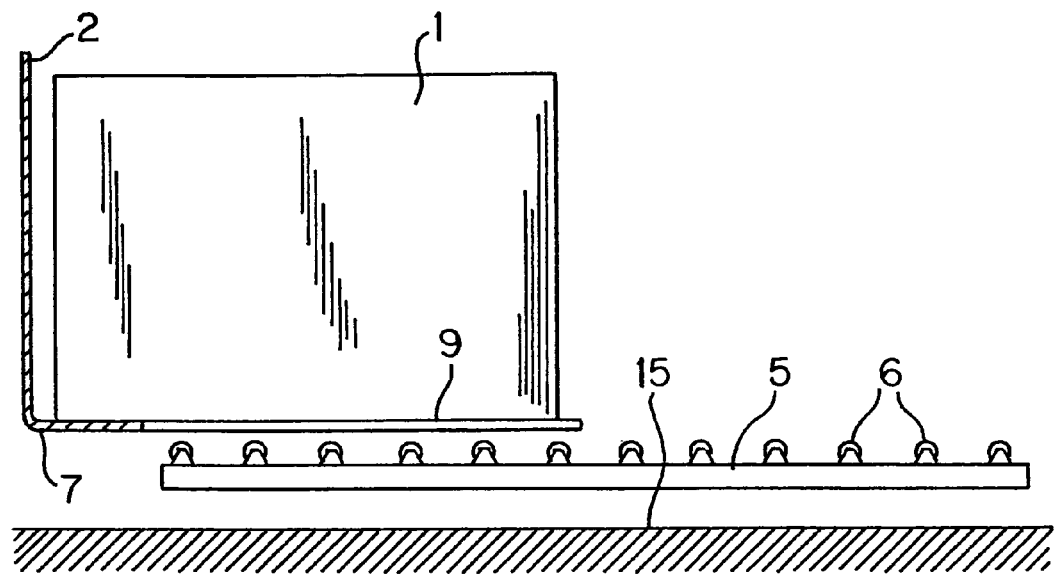
FIG. 2a is a side view of a second embodiment of a battery changing system of the invention.
Figure 2B:
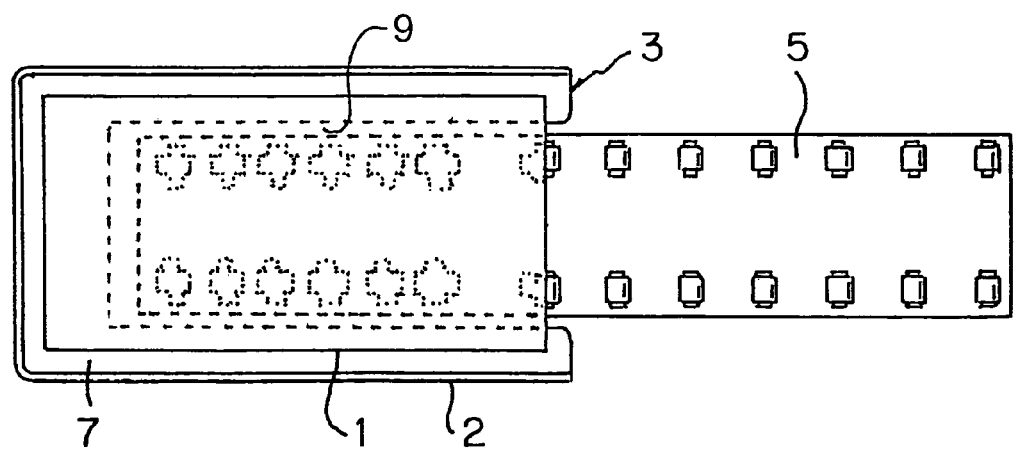

Instead of the openings 8 for individual rollers 6 of the roller conveyor 5, FIGS. 2a, 2b show the floor 7 of the battery compartment with one opening 9 for receiving a plurality of rollers 6 of the roller conveyor 5. The opening 9 can be immediately adjacent to the lateral opening 3 of the battery compartment 2.

Figure 3A:
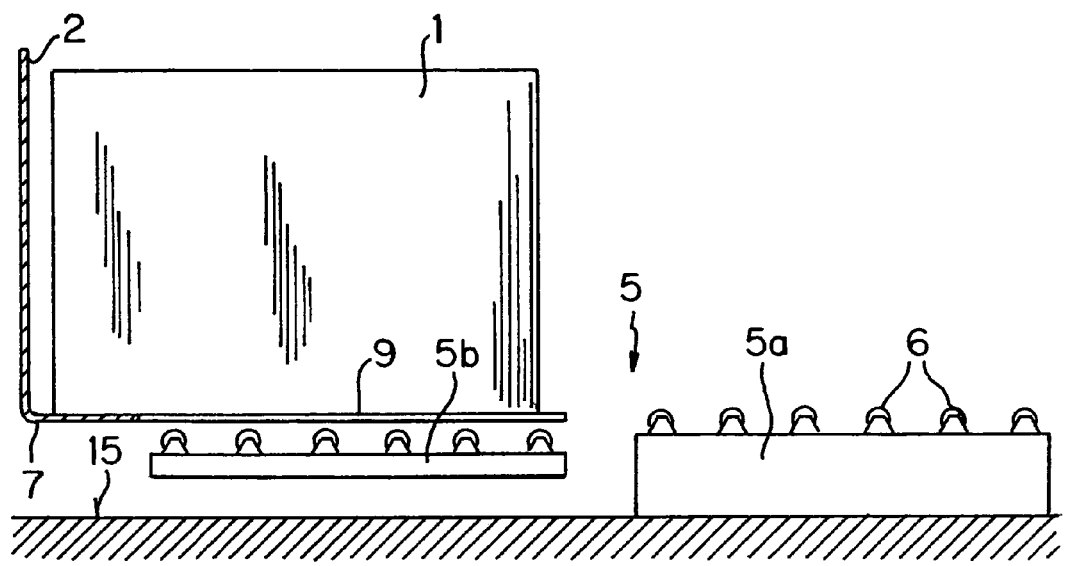
FIG. 3a is a side view of a third embodiment of a battery changing system of the invention.
Figure 3B:
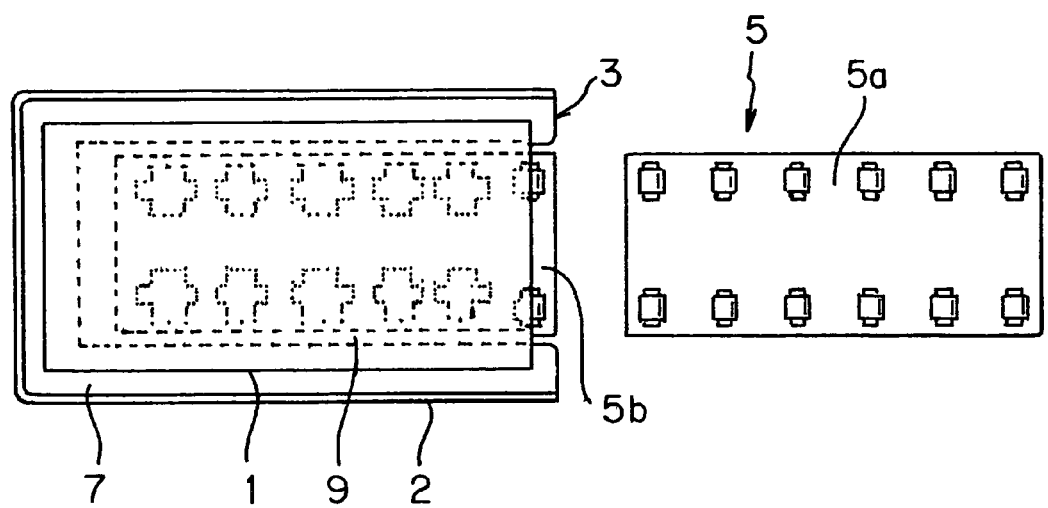

FIGS. 3a and 3b show a roller conveyor 5 that has a two-part construction. A first segment 5a of the roller conveyor 5 can be stationary (i.e., non-movable and/or mounted in place) and can be placed next to the battery compartment 2 to change the battery. The second segment 5b of the roller conveyor 5 can be movable in the vertical direction and can be raised or lowered to change the battery block 1. In the floor 7 of the battery compartment 2, an opening 9 can be provided to receive a plurality of rollers 6 of the segment 5b (as in FIGS. 2a and 2b above) or a plurality of openings can be provided, one for each roller 6 of the segment 5b (as in FIGS. 1a and 1b above). The stationary segment 5a of the roller conveyor can have a height that equals the height of the segment 5b of the roller conveyor 5 prior to the lowering or raising of the battery block 1. As a result of which, the battery block 1 can be pushed into the battery compartment 2 or extracted from the battery compartment 2 without having to overcome any difference in levels.

Figure 4A:
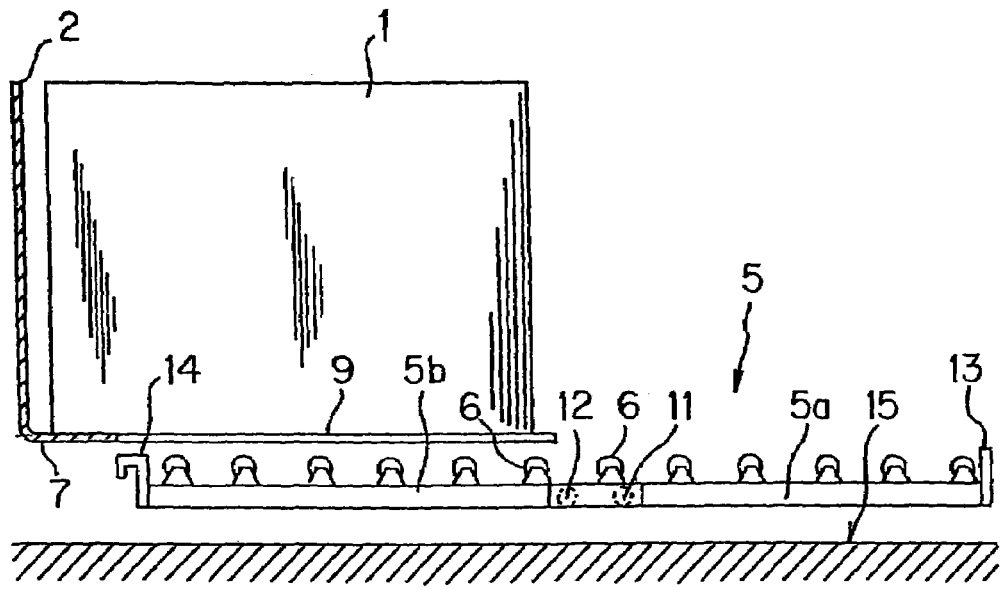
FIG. 4a is a side view of a fourth embodiment of a battery changing system of the invention.
Figure 4B:
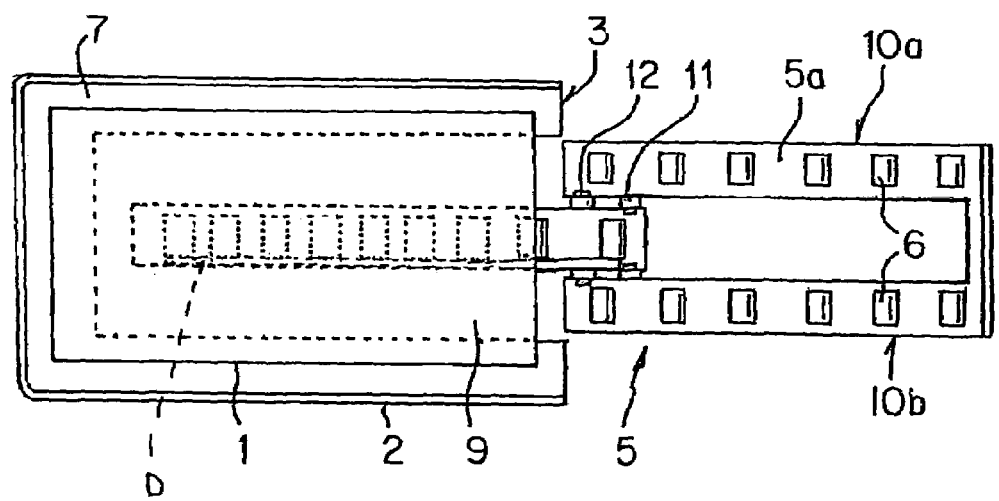

FIGS. 4a, 4b show a vertically movable roller conveyor 5 that has a two-part construction, namely a first segment 5a and at least one second segment 5b which can be moved as an extension of the first segment 5a. The first segment 5a has a plurality, e.g., two, longitudinal beams 10a, 10b which are provided with rollers 6 that are separated from one another in the transverse direction. A longitudinal beam 10c of the second segment 5b that is provided with rollers can be moved longitudinally between the longitudinal beams 10a, 10b. For this purpose, a guide device, such as guide rollers 11, 12, can be provided. The guide rollers 12 can be mounted on the first segment 5a and the guide rollers 11 can be mounted on the second segment 5b. To change the battery, the second segment 5b is pulled out of the first segment 5a and placed underneath the battery compartment 2. By raising and lowering the roller conveyor 5, the battery block 1 can be removed from the battery compartment 2 or inserted into the battery compartment 2.

On the roller conveyor 5, a stop 13 can be provided which limits the movement of the battery block 1 in the position in which it has been extracted from the battery compartment 2.

On the roller conveyor 5, it is also possible to provide a retaining device 14, such as a hook, for example, by means of which the roller conveyor 5 or the second segment 5b of the roller conveyor 5 can be connected with the industrial truck to prevent relative movement between the roller conveyor 5 and the industrial truck during the extraction or insertion of the battery block 1.

The elevating roller conveyor 5 illustrated in FIGS. 1a, 1b, 2a, 2b, and 4a, 4b and the elevating segment 5b illustrated in FIGS. 3a, 3b can be raised and lowered by means of a conventional integrated lifting device (such as a pneumatic or mechanical or electrical lifting device), and can be moved underneath the industrial truck by means of a conventional movable device (such as a hand truck or dolly). It is thereby possible to raise, lower, and/or move the roller conveyor 5 and/or the elevating segment 5b by means of an industrial truck, such as a pallet truck.

The roller conveyor 5 illustrated in FIGS. 1-4 can also be stationary and can be lowered into the floor 15 by means of a suitable conventional lifting device so that the industrial truck can be driven over it to position the roller conveyor 5 to change the battery.

The battery block 1 can be moved onto the roller conveyor 5 manually or by means of a suitable drive device, such as a threaded spindle or a hydraulic cylinder, for example. As shown in FIG. 4b, it is also possible to provide one or more rollers 6 of the roller conveyor 5 with a drive device D to move the battery block 1.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A battery changing system to change the battery block of an industrial truck, comprising:
   a roller conveyor external to the industrial truck, at least a portion of which conveyor can be raised and lowered, and
   a drive device for moving the battery block on the roller conveyor,
   wherein the roller conveyor is configured to be placed underneath a battery compartment of an industrial truck that holds a battery block, wherein a floor surface of the battery compartment of the industrial truck is provided with at least one opening to receive at least one roller of the roller conveyor,
   wherein the battery block is movable all the way out of the battery compartment in a lateral direction of the truck by means of the roller conveyor,
   wherein the roller conveyor includes a first segment and at least one movable second segment,
   wherein the first segment comprises a pair of spaced apart first beams, each having a plurality of rollers, wherein the second segment comprises a second beam located between the first beams and having a plurality of rollers, with the second beam being longitudinally extendable and retractable with respect to the first beams,
   wherein a stop is located on the first segment to limit movement of a battery block,
   wherein a retaining device is located on the second beam and is configured to engage the truck to prevent relative movement between the roller conveyor and the truck during movement of the battery block,
   wherein the second beam has a width that is substantially equal to a width of a space between the first beams of the first segment and substantially equal to the width of one of the first beams for adequately supporting the battery block upon removal and replacement of the battery block relative to the battery compartment of the industrial truck, and wherein the drive device for moving the battery block includes a drive for one or more rollers of the roller conveyor.

2. The battery changing system as claimed in claim 1, wherein the floor of the battery compartment of the industrial truck is provided with a plurality of openings, with each opening configured to receive a roller of the roller conveyor.

3. The battery changing system as claimed in claim 1, wherein the floor of the battery compartment of the industrial truck is provided with one opening for receiving a plurality of rollers of the roller conveyor.

4. The battery changing system as claimed in claim 1, wherein the second segment is mounted by means of a guide device on the first segment so that it can move longitudinally.

* * * * *